(12) United States Patent
Niewiadomski et al.

(10) Patent No.: US 11,851,061 B2
(45) Date of Patent: Dec. 26, 2023

(54) PREVENTION OF TRAILER COUPLER TRACKING JUMP DURING HITCH ASSIST OPERATION

(71) Applicant: Ford Global Technologies, LLC, Dearborn, MI (US)

(72) Inventors: Luke Niewiadomski, Dearborn, MI (US); Douglas J. Rogan, Mountain View, CA (US); Nikhil Nagraj Rao, Santa Clara, CA (US); Vidya Nariyambut Murali, Sunnyvale, CA (US); Bruno Sielly Jales Costa, Santa Clara, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 585 days.

(21) Appl. No.: 16/550,669

(22) Filed: Aug. 26, 2019

(65) Prior Publication Data

US 2021/0061280 A1 Mar. 4, 2021

(51) Int. Cl.
| | |
|---|---|
| *B60W 30/18* | (2012.01) |
| *G05D 1/02* | (2020.01) |
| *B60W 10/18* | (2012.01) |
| *G06T 7/73* | (2017.01) |
| *G06T 7/50* | (2017.01) |
| *B60W 10/20* | (2006.01) |

(52) U.S. Cl.
CPC ...... *B60W 30/18009* (2013.01); *B60W 10/18* (2013.01); *B60W 10/20* (2013.01); *G05D 1/0223* (2013.01); *G05D 1/0253* (2013.01); *G06T 7/50* (2017.01); *G06T 7/73* (2017.01); *B60W 2420/42* (2013.01); *B60W 2554/00* (2020.02); *G06T 2207/30252* (2013.01)

(58) Field of Classification Search
CPC ........... B60W 30/18009; B60W 10/18; B60W 10/20; B60W 2420/42; B60W 2554/00; B60D 1/36; B60D 1/62; B62D 13/06; B62D 15/0285; G05D 1/0223; G05D 1/0253; G05D 2201/0213; G05D 1/0246; G05D 1/0225; G06T 7/50; G06T 7/73; G06T 2207/30252
See application file for complete search history.

(56) References Cited

U.S. PATENT DOCUMENTS

| | | | |
|---|---|---|---|
| 5,309,289 | A | 5/1994 | Johnson |
| 5,729,194 | A | 3/1998 | Spears et al. |
| 8,308,182 | B2 | 11/2012 | Ortmann et al. |
| 8,888,120 | B2 | 11/2014 | Trevino |

(Continued)

*Primary Examiner* — Geepy Pe
*Assistant Examiner* — Paulo Roberto Gonzalez Leite
(74) *Attorney, Agent, or Firm* — Lorne Forsythe; Price Heneveld LLP

(57) ABSTRACT

A hitch assist system for a vehicle comprises an imaging system that receives image data of a hitch ball and trailer coupler, and a controller. The controller estimates a distance between a point on each of the hitch ball and trailer coupler. The points are parallel to a plane defined by a surface beneath the hitch ball and trailer coupler. The controller tracks the distance with a pixel-domain comparison between each of the points responsive to the distance being less than a first threshold, and maneuvers, via steering and braking systems, the vehicle along a path such that the distance is indicative of the points being coaxial.

16 Claims, 10 Drawing Sheets

(56) References Cited

U.S. PATENT DOCUMENTS

| | | |
|---|---|---|
| 9,102,271 B2 | 8/2015 | Trombley et al. |
| 9,499,018 B2 | 11/2016 | Gehrke et al. |
| 9,821,845 B2 | 11/2017 | Xu et al. |
| 2005/0074143 A1 | 4/2005 | Kawai |
| 2011/0216199 A1 | 9/2011 | Trevino et al. |
| 2012/0283909 A1 | 11/2012 | Dix |
| 2014/0012465 A1 | 1/2014 | Shank et al. |
| 2014/0226009 A1 | 8/2014 | Lynam et al. |
| 2016/0052548 A1 | 2/2016 | Singh et al. |
| 2018/0251153 A1 | 9/2018 | Li et al. |
| 2018/0312022 A1* | 11/2018 | Mattern ............... B62D 15/026 |
| 2019/0339704 A1* | 11/2019 | Yu ............................ G06T 7/246 |

* cited by examiner

PREVENTION OF TRAILER COUPLER TRACKING JUMP DURING HITCH ASSIST OPERATION

FIELD OF THE INVENTION

The present disclosure generally relates to hitch assist systems that estimate a distance between a hitch ball and a coupler. In particular, the present disclosure relates to hitch assist systems that inhibit tracking jumps on the coupler within a threshold distance while using a pixel-domain comparison to estimate a distance between the hitch ball and coupler.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstances, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause the vehicle to come into contact with the trailer. Accordingly, further advancements may be desired.

SUMMARY OF THE INVENTION

According to one aspect of the present disclosure, a system for assisting in aligning a vehicle for hitching with a trailer comprises a steering system that adjusts a steering angle of the vehicle, a braking system that adjusts a speed of the vehicle, an imaging system that receives image data of a hitch ball and trailer coupler, and a controller. The controller estimates a distance between a first point on the hitch ball and a second point on the trailer coupler, wherein the points are parallel to a plane defined by a surface beneath the hitch ball and trailer coupler. The controller tracks the distance between pixels associated with the first point and the second point in response to the distance being less than a first threshold, and maneuvers, via the steering and braking systems, the vehicle along a path, and that identifies an alignment of the first point with the second point on the plane.

According to another aspect of the present disclosure, a hitch assist system for a vehicle comprises an imaging system that receives image data of a hitch ball and trailer coupler, and a controller. The controller estimates a distance between a point on each of the hitch ball and trailer coupler. The points are parallel to a plane defined by a surface beneath the hitch ball and trailer coupler. The controller tracks the distance with a pixel-domain comparison between each of the points responsive to the distance being less than a first threshold, and maneuvers, via steering and braking systems, the vehicle along a path such that the distance is indicative of the points being coaxial.

According to yet another aspect of the present disclosure, a method for assisting in aligning a vehicle for hitching with a trailer comprises receiving image data of a hitch ball and trailer coupler from a vehicle imaging system, and estimating a distance between a point on each of the hitch ball and trailer coupler with a controller. The points are parallel to a plane defined by a surface beneath the hitch ball and trailer coupler. The method also includes tracking the distance using a pixel-domain comparison between each of the points responsive to the distance being less than a first threshold with the controller, and controlling, via steering and braking systems, the vehicle along a path such that the distance is indicative of the points being coaxial.

Embodiments of the disclosure can include any one or a combination of the following features:

- a steering system that adjusts a steering angle of the vehicle;
- a braking system that adjusts a speed of the vehicle;
- an imaging system that receives image data of a hitch ball and trailer coupler;
- a controller that estimates a distance between a first point on the hitch ball and a second point on the trailer coupler, wherein the points are parallel to a plane defined by a surface beneath the hitch ball and trailer coupler, that tracks the distance between pixels associated with the first point and the second point in response to the distance being less than a first threshold that maneuvers, via the steering and braking systems, the vehicle along a path, and that identifies an alignment of the first point with the second point on the plane;
- the controller inhibits the estimate of the distance being greater than a second threshold responsive to the distance being less than the first threshold;
- the controller notifies the imaging system of the estimate of the distance being greater than the second threshold;
- the controller maneuvers, via the steering and braking systems, the vehicle along the path responsive to the distance being greater than the first threshold;
- the point on the hitch ball is indicative of a center point of the hitch ball, and the point on the trailer coupler is indicative of a center point of the trailer coupler;
- the pixel-domain comparison is linearly transformed to track the distance;
- the controller:
- activates the braking system to stop the vehicle on the path responsive to the distance being less than a third threshold, wherein the third threshold is defined by a plurality of factors;
- an imaging system that receives image data of a hitch ball and trailer coupler;
- a controller that estimates a distance between a point on each of the hitch ball and trailer coupler, wherein the points are parallel to a plane defined by a surface beneath the hitch ball and trailer coupler, that tracks the distance with a pixel-domain comparison between each of the points responsive to the distance being less than a first threshold, and that maneuvers, via steering and braking systems, the vehicle along a path such that the distance is indicative of the points being coaxial;
- the controller inhibits the estimate of the distance being greater than a second threshold responsive to the distance being less than the first threshold;
- the controller:
- notifies the imaging system of the estimate of the distance being greater than the second threshold;

the controller maneuvers, via the steering and braking systems, the vehicle along the path responsive to the distance being greater than the first threshold;

the point on the hitch ball is indicative of a center point of the hitch ball, and the point on the trailer coupler is indicative of a center point of the trailer coupler;

the pixel-domain comparison is linearly transformed to track the distance;

the controller activates the braking system to stop the vehicle on the path responsive to the distance being less than a third threshold, wherein the third threshold is defined by a plurality of factors;

receiving image data of a hitch ball and trailer coupler from a vehicle imaging system;

estimating a distance between a point on each of the hitch ball and trailer coupler with a controller, the points being parallel to a plane defined by a surface beneath the hitch ball and trailer coupler;

tracking the distance using a pixel-domain comparison between each of the points if the distance is less than a first threshold with the controller;

controlling, via steering and braking systems, the vehicle along a path such that the distance is indicative of the points being coaxial;

inhibiting, via the controller, the estimate of the distance being greater than a second threshold responsive to the distance being less than the first threshold;

notifying, via the controller, the imaging system of the estimate of the distance being greater than the second threshold;

controlling, via the steering and braking systems, the vehicle along the path responsive to the distance being greater than the first threshold;

the point on the hitch ball is indicative of a center point of the hitch ball, and the point on the trailer coupler is indicative of a center point of the trailer coupler; and activating the braking system to stop the vehicle on the path responsive to the distance being less than a third threshold, wherein the third threshold is defined by a plurality of factors.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
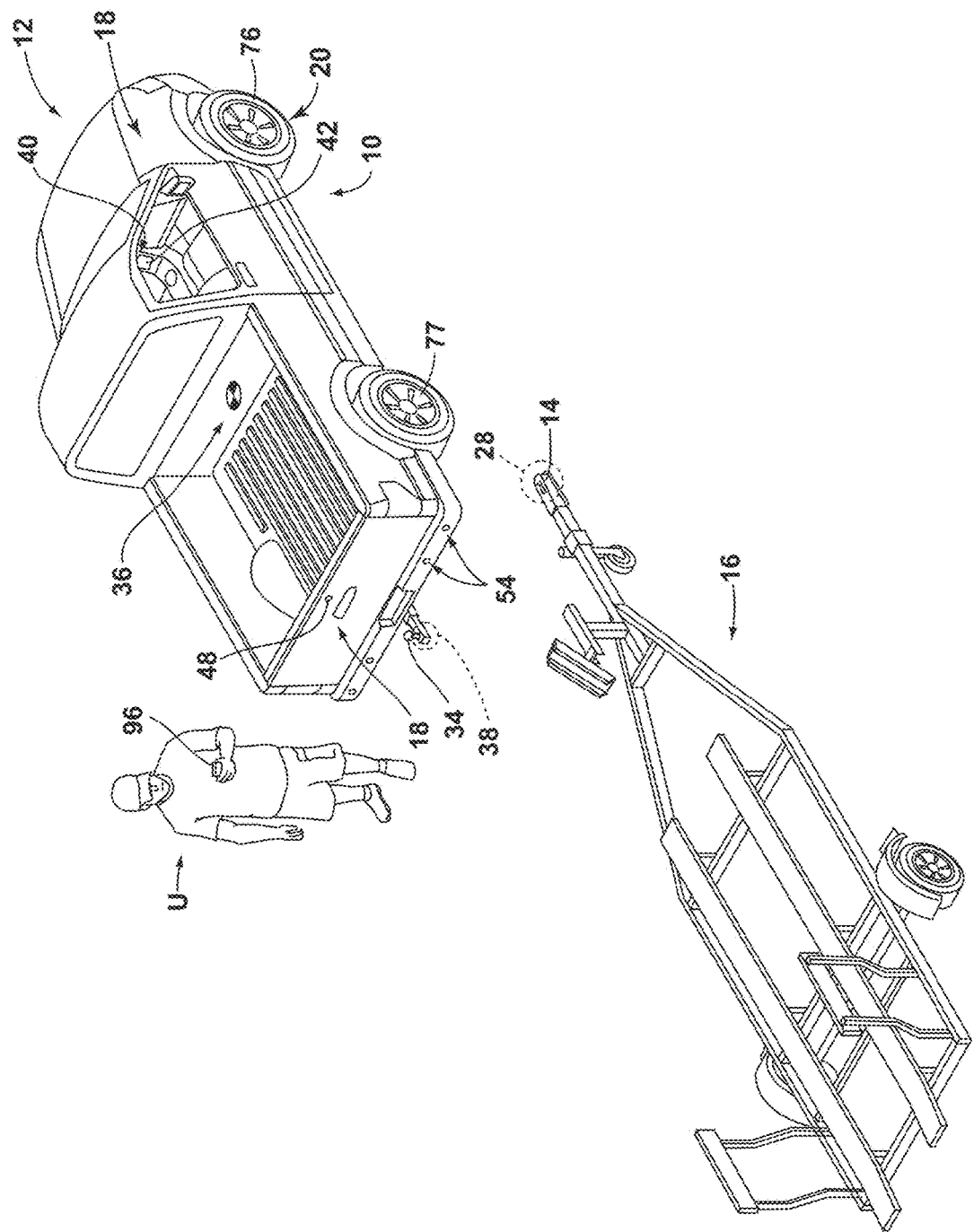
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Referring generally to FIGS. 1-6, reference numeral 10 designates a hitch assistance system (also referred to as a "hitch assist" system or a "hitching assistance" system) for a vehicle 12. As illustrated in the system diagram of FIG. 2, various sensors and devices obtain or otherwise provide vehicle status-related information. This information includes positioning information from a positioning system 22, which may include a dead-reckoning device 24 or, in addition or as an alternative, a global positioning system (GPS), to determine a coordinate location of the vehicle 12 based on the one or more locations of the devices within the positioning system 22. In particular, the dead-reckoning device 24 can establish and track the coordinate location of the vehicle 12 within a localized coordinate system 82 based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor array 54, and other vehicle sensors and devices, may provide sensor signals or other information, such as sequential images of a trailer 16, including the detected coupler 14, that the controller 26 of the hitch assist system 10 may process with various routines to determine the height H and position of coupler 14.

Figure 2:
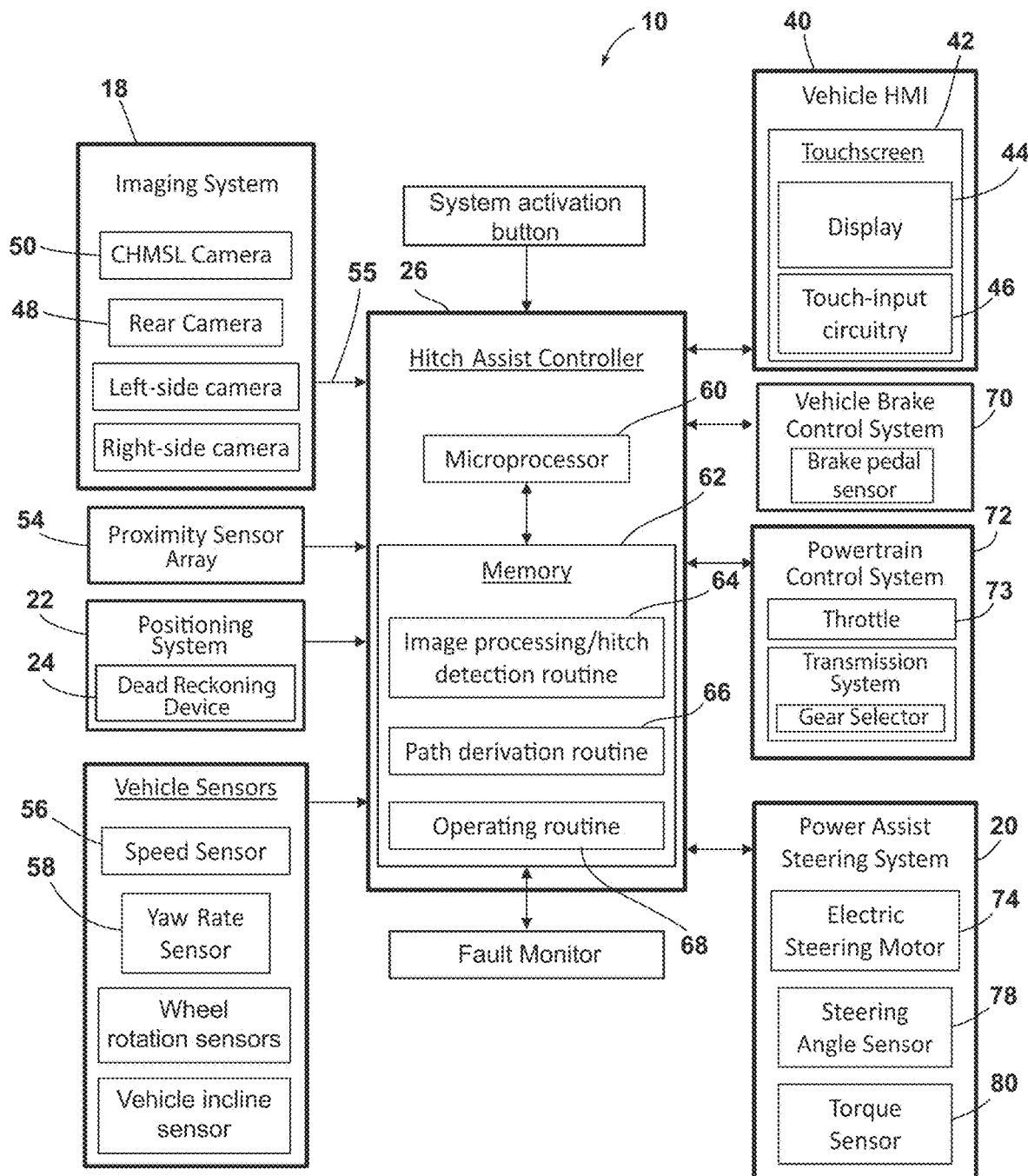
FIG. 2 is a diagram of a system, according to an aspect of the disclosure, for assisting in aligning the vehicle with a trailer in a position for hitching the trailer to the vehicle.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS")

system including electric steering motor 74 for turning the steered wheels 76 to a steering angle δ based on a steering command, whereby the steering angle δ may be sensed by a steering angle sensor 78 of the power assist steering system 20. The steering command may be provided by the hitch assist system 10 for autonomously steering during a trailer hitch alignment maneuver and may, alternatively, be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and, therefore, indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
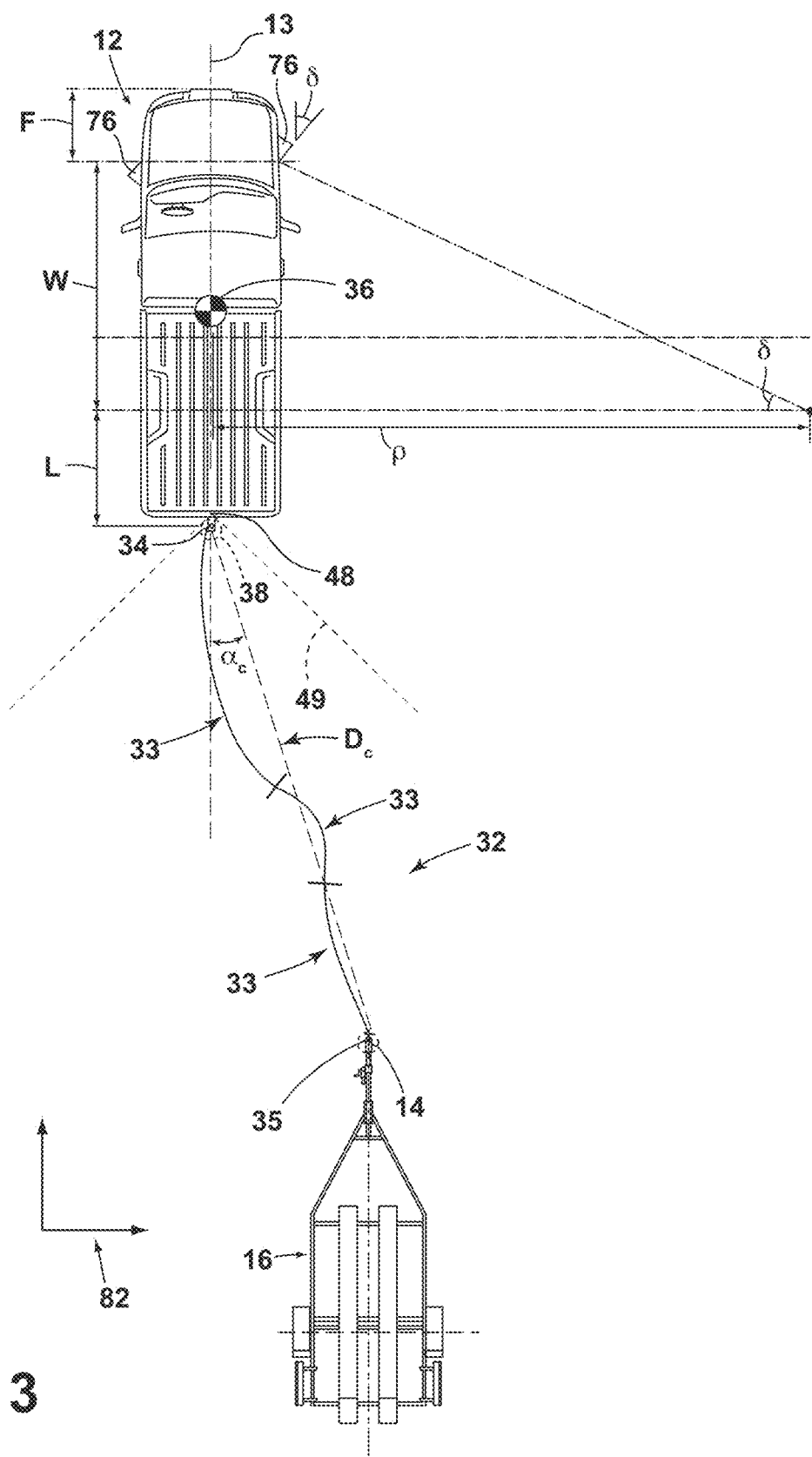
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed below further.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate γ, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for contact with trailer 16, and can bring vehicle 12 to a complete stop at a determined endpoint 35 of path 32. It is disclosed herein that the hitch assist system 10 can additionally, or alternatively, issue an alert signal corresponding to a notification of an actual, impending, and/or anticipated impact with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent impact with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like, can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing routine 64 and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like, that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which, in the illustrated examples, include rear camera 48, center high-mount stoplight (CMHSL) camera 50, and side-view cameras, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras included in imaging system 18 can be positioned to generally overlap in their respective fields of view, which may correspond with rear camera 48, center high-mount stoplight (CMHSL) camera 50, and side-view cameras, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view, including any objects (obstacles or coupler 14, for example) therein. In an embodiment, use of two images including the same object can be used to determine a location of the object relative to the two image sources, given a known spatial relationship between the image sources. In this respect, the image processing routine 64 can use known programming and/or functionality to identify an object within image data 55 from the various cameras within imaging system 18. In either example, the image processing routine 64 can include information related to the positioning of any cameras present on vehicle 12 or utilized by system 10, including relative to the center 36 (FIG. 1) of vehicle 12, for example, such that the positions of cameras relative to center 36 and/or to each other can be used for object positioning calculations and to result in object position data relative to the center 36 of vehicle 12, for example, or other features of vehicle 12, such as hitch ball 34 (FIG. 1), with known positions relative to the center 36. In one aspect, the various systems and vehicle features discussed herein, including imaging system 18, positioning system 22, brake control system 70, powertrain control system 72, power assist steering system 20, proximity sensor array 54, positioning system 22, and the vehicle sensors discussed herein may generally be used for purposes of vehicle control, such as under control of the user, including potentially with assistance of an on-board computer or other processor communicating with the systems and features. In this manner, the systems and features can be referred to collectively as a vehicle control system that may be utilized by controller 26 for the automatic vehicle control functionality discussed herein.

The image processing routine 64 can be specifically programmed or otherwise configured to locate coupler 14 within image data 55. In an example, the image processing routine 64 can first attempt to identify any trailers 16 within the image data 55, which can be done based on stored or otherwise known visual characteristics of trailer 16, of a number of different types, sizes or configurations of trailers compatible with system 10, or trailers, in general. Controller 26 can seek confirmation from the user that the identification of the trailer 16 is accurate and is the correct trailer for which to complete an assisted hitching operation, as described further below. After the trailer 16 is identified, controller 26 may then identify the coupler 14 of that trailer 16 within the image data 55 based, similarly, on stored or otherwise known visual characteristics of coupler 14 or couplers, in general. In another embodiment, a marker in the form of a sticker, or the like, may be affixed with trailer 16 in a specified position relative to coupler 14 in a manner similar to that which is described in commonly assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the position 28 of coupler 14 can be determined based on the marker location. Additionally, or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data 55 makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 results in a change to the particular image within the data 55 that can improve the resolution or move the coupler 14 relative to the remaining portions of trailer 16 such that the coupler 14 can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ offset between a line connecting hitch ball 34 and coupler 14 and the longitudinal axis 13 of vehicle 12. Image processing routine 64 can also be configured to identify the trailer 16 overall and can use the image data 55 of trailer 16, alone or in combination, with the image data 55 of coupler 14, to determine the orientation or heading 33 of trailer 16. In this manner, the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without unintentional contact between vehicle 12 and trailer 16 and may further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{W}{\tan\delta}, \quad (1)$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{W}{\tan\delta_{max}}. \quad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position 28 of vehicle 12, which can be based on the center 36 of vehicle 12, a location along the rear axle, the location of the dead-reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of a mass of vehicle 12, the location of a GPS receiver, or another specified, known area) to determine the needed positioning of vehicle 12 to align hitch ball 34 with coupler 14. It is noted that hitch assist system 10 can compensate for horizontal movement $\Delta_x$ of coupler 14 in a driving direction by determining the movement of coupler 14 in the vertical direction $\Delta_y$ that will be needed to receive hitch ball 34 within coupler 14. Such functionality is discussed further in co-pending, commonly-assigned U.S. Pat. Nos. 9,821,845 and 10,870,323, the entire disclosures of which are hereby incorporated by reference herein.

As discussed above, once the desired path 32, including endpoint 35, has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position 28 of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle $\delta$, as dictated by path 32, depending on the position 28 of vehicle 12 therealong. It is additionally noted that in an embodiment, the path 32 may comprise a progression of steering angle $\delta$ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include two portions defined by steering of wheels 76 in different directions to collectively traverse the needed lateral movement of vehicle 12, while providing a final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position 28 and orientation data acquired from a portable device 96, such as a smartphone, can be fine-tuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead-reckoning device 24 can be used to track the location of vehicle 12 in its movement along path 32 toward the initially-derived endpoint 35.

Figure 4:
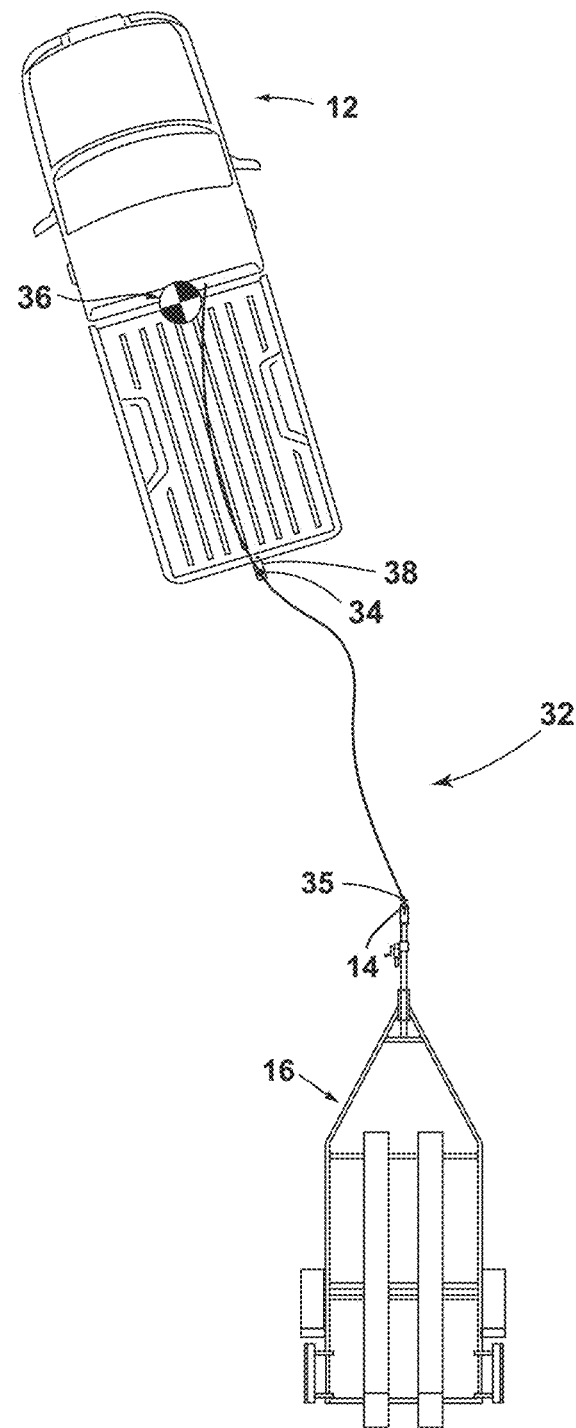
FIG. 4 is an overhead schematic view of the vehicle during a subsequent step of the alignment sequence with the trailer.
Figure 5:
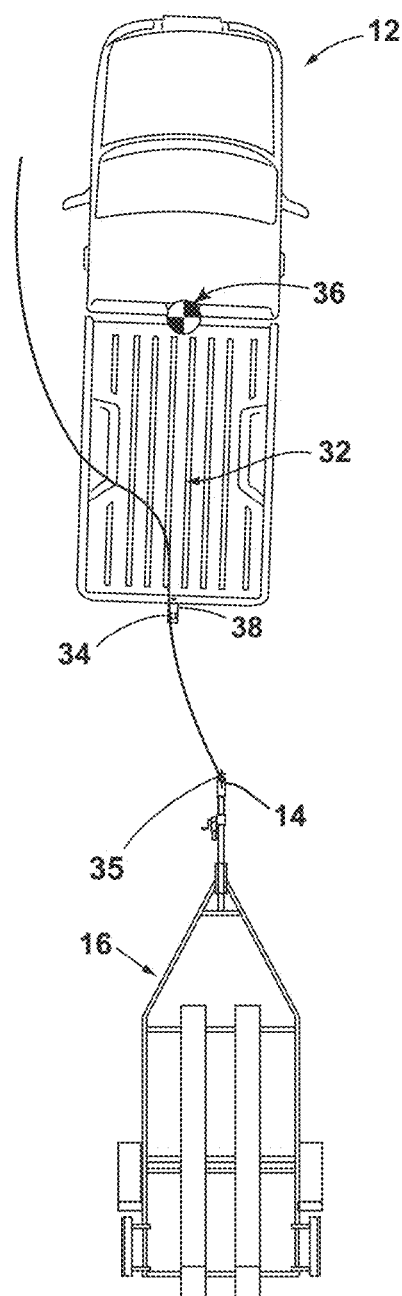
FIG. 5 is an overhead schematic view of the vehicle during a subsequent step of the alignment sequence with the trailer.
Figure 6:
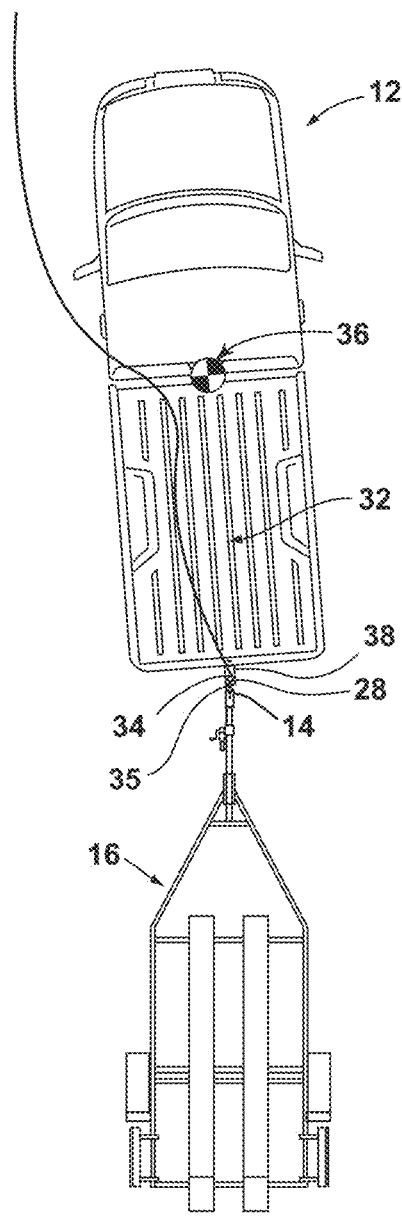
FIG. 6 is an overhead schematic view of the vehicle during a subsequent step of the alignment sequence with the trailer and showing the position of a hitch ball of the vehicle at an end of a derived alignment path.

As shown in FIGS. 4-6, once the trailer 16 and coupler 14 have been identified, and system 10 determines the path 32 to align hitch ball 34 with the coupler 14, the controller 26 executing operating routine 68 may continue to control vehicle 12 until hitch ball 34 is in the desired endpoint 35 relative to coupler 14 for coupler 14 to engage with hitch ball 34 when coupler 14 is lowered into horizontal alignment therewith. In the example discussed above, image processing routine 64 continuously monitors the positioning $D_c$, $\alpha_c$ of coupler 14, constantly or once available, during execution of operating routine 68, including as coupler 14 comes into clearer view of a rear camera 48, with continued movement of vehicle 12 along path 32. As discussed above, the position 28 of vehicle 12 can also be monitored by dead-reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $\alpha_c$ information due to closer resolution or additional image data 55), including as vehicle 12 moves closer to trailer 16, as shown in FIGS. 4 and 5. Still further, the coupler 14 can be assumed to be static such that the position 28 of vehicle 12 can be tracked by continuing to track the coupler 14 to remove the need for use of the dead-reckoning device 24. In a similar manner, a modified variation of operating routine 68 can progress through a predetermined sequence of maneuvers involving steering of vehicle 12 at or below a maximum steering angle $\delta_{max}$, while tracking the position $D_c$, $\alpha_c$ of coupler 14 to converge the known relative position of hitch ball 34 to the desired position 38 thereof relative to the tracked position 28 of coupler 14, as discussed above and shown in FIG. 6.

During an assisted hitching operation, such as in the example described with respect to FIGS. 4-6, system 10 requires a minimum amount of longitudinal distance between the vehicle 12 and the trailer 16 to control movement of vehicle 12 with a level of precision desired to achieve the desired final position of hitch ball 34 with respect to coupler 14 (i.e., without overshooting the desired final location, such that hitch ball 34 moves past the coupler 14, or otherwise ending operating routine 68 with hitch ball 34 positioned relative to coupler 14 such that manual movement of trailer 16 is required). The required minimum distance can vary but is generally influenced by the requirements of image processing routine 64, as well as the requirements of speed sensor 56, the responsiveness of the throttle 73 and vehicle powertrain control system 72, as well as the general processing speed of controller 26 of other components of the hitch assist system 10. In one example, image processing routine 64 may require a minimum travel distance for calibration thereof, including to accurately identify coupler 14 and to assist in tracking of the movement of vehicle 12. As discussed further below, the particular minimum distance can be estimated for a given implementation of system 10, based on known values or estimates for such factors. In general, because of the minimum travel distance requirement, if vehicle 12 is at a standstill with insufficient longitudinal distance remaining between hitch ball 34 and coupler 14, the system 10 may be programmed to either not initiate operating routine 68 or, if already started, abort operating routine 68 to avoid overshooting the final target position such that hitch ball 34 moves past endpoint 35. In various examples, vehicle 12 may be brought to a standstill for reasons other than operating routine 68 causing the application of the vehicle brakes with the braking control system 70. In particular, vehicle 12 may come to a standstill before reaching the desired final target position due to uneven terrain acting on the vehicle wheels 76 or 77, or by the vehicle brakes being manually applied by the driver. Because such events can cause a vehicle 12 standstill at any point along path 32, the hitch assist system 10 provides the ability to detect such a standstill event and to address it appropriately given the capabilities and requirements of the hitch assist system 10. In various examples, the hitch assist system 10 can address an early standstill by aborting, pausing, or automatically rectifying the standstill condition.

As mentioned above, the "longitudinal control" in an assisted hitching maneuver is the portion of the movement of vehicle 12 along path 32 controlled by the vehicle powertrain control system 72 and the vehicle brake control system 70 with the "longitudinal control" being the portion controlled by the power assist steering system 20. It is to be understood that the lateral control requires movement of the vehicle such that the two control schemes operate together to move vehicle 12 along the path 32. In this respect, the longitudinal alignment of the path 32 with the coupler 14 is dictated by the longitudinal control (i.e., by the steering system 20) and the final stopping point of vehicle 12 along path 32 is dictated by the longitudinal control. In this respect, the final stopping point of the vehicle 12 along path 32 determines the alignment in the direction of travel between hitch ball 34 and coupler 14. In this manner, the hitch assist system 10 may be able to move the vehicle 12 to the final target position in a precise manner, for example, such that trailer 16 does not have to be manually repositioned by the user, but can simply be lowered onto hitch ball 34. In one implementation of system 10, the accuracy in final longitudinal alignment of hitch ball 34 with coupler 14 can be within 1 cm of a completely aligned position (center-to-center). Again, the particular implementation of system 10 can be such that controller 26 requires a minimum amount of longitudinal travel distance to perform a sequence of events for the desired hitch ball 34 and coupler 14 alignment. Such a sequence can include increasing the engine speed (using throttle 73 via powertrain control system 72) and reducing the brake pressure (via brake control system 70) until vehicle 12 begins moving. Controller 26 can receive feedback data during vehicle 12 movement regarding measured vehicle speed and localization (by way of speed sensor 56 and positioning system 22, respectively) such that controller 26 can apply brake pressure and reduce engine speed to bring the vehicle 12 to a standstill at the final target position with hitch ball 34 at endpoint 35. Again, to begin movement to a detectable speed or by a detectable distance and return the vehicle 12 to a stop (including in a comfortable manner), the above sequence requires a minimum amount of travel distance to perform. In one example, based on the vehicle 12 and terrain conditions, the hitch assist system 10 may be capable of accurately moving the vehicle 12 by a minimum of 0.2 m, with any lesser distance not being accurately controllable. Accordingly, if the vehicle 12 is, for whatever reason, at a standstill with less than 0.2 m between the hitch ball 34 and the subject coupler 14, the hitch assist system 10 will be unable to travel to the target position without an undesirable chance of overshooting or falling short of the final target position such that hitch ball 34 is short of endpoint 35. As discussed above, the particular requirements of any implementation of system 10 may vary in various respects that affect the minimum travel distance, which may be characterized as a threshold distance $D_{min}$, below which system 10 may not be able to initiate movement under operating routine 68. According to such variations, the threshold distance $D_{min}$ may be between 15 cm and 20 cm, for example. Again, such misalignment can increase a chance of the vehicle 12 unintentionally contacting the trailer 16 at coupler 14 or can otherwise result in misalignment of the hitch ball 34 and the coupler 14 by an amount outside of user expectations for system 10 use.

There are a number of events that can cause vehicle 12 to reach a standstill during an assisted hitching maneuver before reaching the final target position. As discussed above, controller 26 executing operating routine 68 does not directly cause vehicle 12 to stop until it is determined that vehicle 12 has reached the final target position with hitch ball 34 aligned with endpoint 35; however, various operating conditions may cause vehicle 12 to inadvertently reach a standstill during operation. Notably, during execution of operating routine 68, a low speed of vehicle 12 is maintained (at least within the final 1 to 2 m of the final target position, as determined by the distance between hitch ball 34 and endpoint 35) to allow for precise stopping in the desired position 38 at the end of the operation. At such low speeds, the vehicle 12 carries a lower inertia and is driven by a lower torque output of the engine such that vehicle 12 may be brought to a standstill by uneven terrain, or by driver-applied braking (even at a generally light application pressure). In one example, the vehicle speed, during at least the latter stages of operating routine 68, execution may be on the order of 0.1 kph. In an example, an assisted hitching maneuver may occur off of a paved surface, including on uneven terrain that can easily bring the vehicle to a stop (i.e. bumps, pits, rocks). In other examples, the vehicle 12 may encounter debris or other articles or defects (rocks, cracks, potholes, bumps) in a paved driving surface that may disrupt vehicle 12 movement. Still further, drivers may habitually contact or grasp the steering wheel or depress the brake pedal during vehicle movement, especially when the vehicle 12 is close to the trailer 16 where they may not be able to visualize the hitch ball 34 or coupler 14.

Figure 7A:
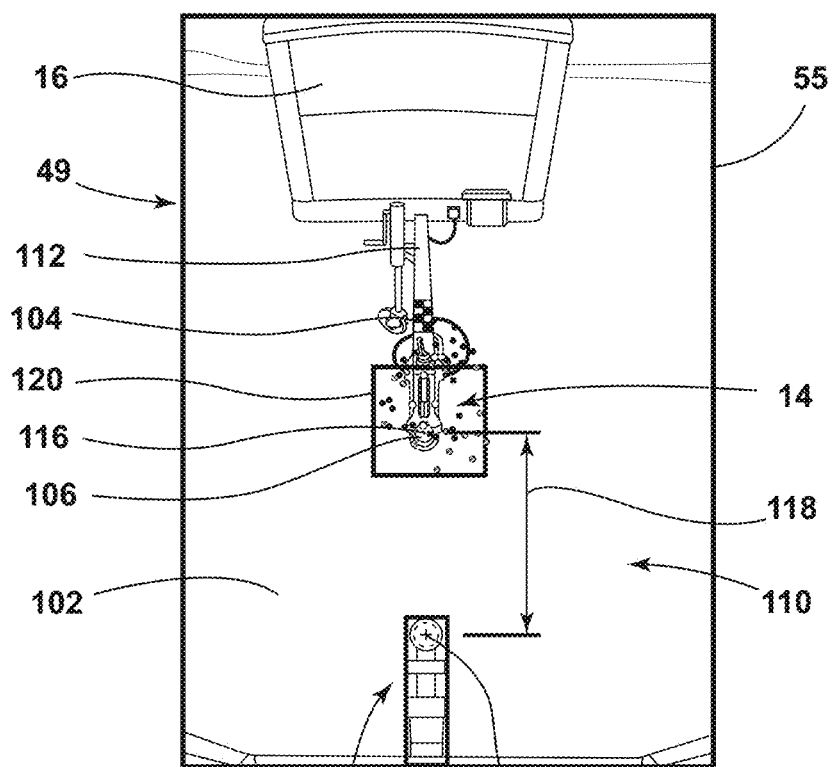
FIGS. 7A-7B are rear perspective views of a hitch assist system that estimates an endpoint on a coupler.
Figure 7B:
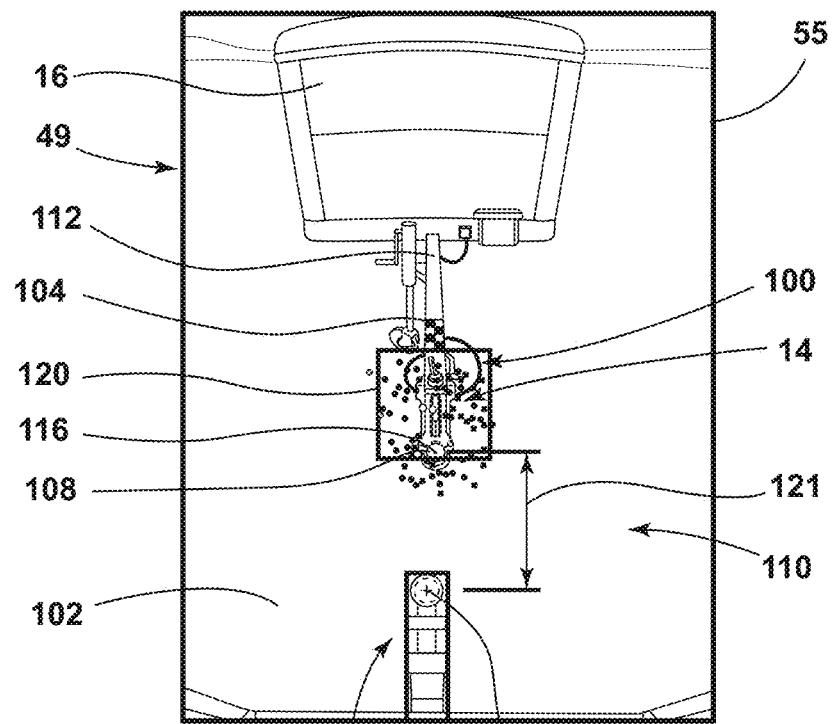

Referring to FIGS. 7A-7B, rear perspective views of the hitch assist system 10 tracking the trailer 16 under various conditions are depicted. FIGS. 7A-7B depict the field-of-view 49 described above as image data 55 on the display 44 of the interface 40. In FIG. 7A, a rear, perspective view is shown depicting the hitch assist system 10 tracking a visible coupler 14 with ideal lighting. In FIG. 7B, a rear perspective view is shown depicting the hitch assist system 10 including a tracking jump 100 on a coupler 14 if the coupler 14 is not visible, or is an area 102 without ideal lighting. During the maneuver, vision processing techniques are used to track the coupler 14. While properly tracking the coupler 14, noise factors may cause the hitch assist system 10 to begin tracking the tongue 104. Noise is introduced when the vehicle 12 maneuvers near to the trailer 16, such as the area 102 with a shadow indicative of the vehicle 12, over the tongue 104, visual perspective changes from a camera angle, and sun reflections off the tongue 104, for example. If the hitch assist system 10 switches to track the tongue 104 instead of the coupler 14, the vehicle 12 may contact the coupler 14.

To account for the potential noise, the hitch assist system 10 is designed to track a first point 114, shown in FIG. 7A, on the tongue 104 during the maneuver, before the noise factors are introduced. Within a threshold distance from the trailer 16, the hitch assist system 10 inhibits the controller 26 from changing the tracked, first point 114 to any point further from the vehicle's direction of travel, beyond a threshold amount. This effectively prevents the controller 26 from "skipping" backwards along the tongue 104 during tracking. During the maneuver, the hitch assist system 10 continually tracks the coupler 14, which is the targeted endpoint 35 for the hitch ball 34 to align with at completion of the path 32. If the endpoint 35 was further away than the coupler 14, the vehicle 12 may contact the coupler 14 since the steering and braking systems 20, 70 will continue maneuvering toward the endpoint 35. The controller 26 may track the coupler 14 within a first threshold, and, outside of the first threshold, the controller 26 may skip, or jump to a second point 116, shown in FIG. 7B, on the tongue 104. The skip is caused by the second point 116 on the tongue 104 becoming significantly more noticeable in the image data 55 to the imaging system 18 than the coupler 14, for example if the coupler 14 is camouflaged against a ground surface 110 due to the shadowed area 102.

The "skip" between the first and second points 114, 116 may be caused by a variety of factors. Depending on a position of the sun, the vehicle 12 may cause a shadowed area 102 that covers the coupler 14 as the vehicle 12 approaches the trailer 16. The shadowed area 102 may darken the coupler 14 more than the trailer 16 in the image data 55, either for a transient amount of time, or a remainder of the maneuver. The field-of-view 49 from the rear camera 48 relative to the coupler 14 may also become more downward-facing as the vehicle 12 approaches the trailer 16. Since the controller 26 tracks the endpoint 35 based on perspective, a reduction in clarity between the coupler 14 and the ground surface 110 negatively impacts an ability of the hitch assist system 10 to distinguish between the coupler 14 and the tongue 104. Changes in sun reflections off the coupler 14 and tongue 104 may also occur as the vehicle 12 approaches the trailer 16. If reflection off the tongue 104 occurs, the controller 26 may incidentally change tracking to the reflection and tongue 104, as the coupler 14 becomes less distinguishable in the image data 55. Also, a jack assembly 112 attached with the tongue 104 may contain several circular elements. If a Hough transform (or similar technique) is used to track the circular appearance of the coupler 14, the circular elements of the jack assembly 112 may be more suitable to track as the tongue 104 becomes more visible during the vehicle's approach.

In an instance of the present disclosure, the controller 26 is programmed to track the coupler 14 from the image data 55 as the vehicle 12 maneuvers in a direction of the trailer 16. During the maneuver, at the threshold distance to the trailer 16, the hitch assist system 10 inhibits any skip, or jump, as described, of the endpoint 35 beyond a second threshold, or a maximum value, in a direction opposite of the direction of the trailer 16. Therefore, the hitch assist system 10 is capable of instantaneously updating the endpoint 35 on the trailer 16 in a direction opposite the direction of travel. This further aids to prevent contact between the vehicle 12 and the trailer 16.

The controller 26 for the hitch assist system 10 is programmed to estimate the endpoint 35 of the path 32 to be on the coupler 14 based on a distance 118 between the first point 114 on the hitch ball 34 and the second point 116 on the coupler 14. For example, the controller 26 is programmed to measure the distance 118 along the ground surface 110 between the first point 114 on the hitch ball 34 and the second point 116 on the coupler 14. Likewise, the controller 26 is programmed to measure a change 121 in the distance 118 from the first point 114 on the hitch ball 34 to the second point 116 on the coupler 14 as the vehicle 12 maneuvers along the path 32. Therefore, the hitch assist system 10 may be configured to inhibit the "skips" or jumps during tracking if the distance 118 along the ground surface 110 between the first point 114 on the hitch ball 34 and the second point 116 on the coupler 14 is less than the first threshold and the change 121 in the distance 118 from the first point 114 on the hitch ball 34 to the second point 116 on the coupler 14 as the vehicle 12 maneuvers along the path 32 is greater than the second threshold. Again, the first threshold may be a calibrated constant indicative of the distance 118 from the first point 114 on the hitch ball 34 to the second point 116 on the coupler 14. Alternatively, the first threshold may be dependent on an operating mode of the vehicle, such as, but not limited to, speed, acceleration, or any other operating mode of the vehicle 10. The hitch assist system 10 begins to inhibit the "skips" if the distance 118 from the first point 114 on the hitch ball 34 and the second point 116 on the coupler 14 is less than the first threshold. Similarly, the second threshold is a calibrated constant indicative of a maximum value provided to the controller 26 to jump to the second point 116 on the coupler 14 such that any jump above this maximum value is inhibited by the hitch assist system 10.

When the hitch assist system 10 inhibits a jump, the hitch assist system 10 outputs a Boolean flag to the controller 26 indicating that a last reported position of the second point 116 on the coupler 14 has been inhibited. If the hitch assist system 10 inhibits a "skip," reported 2D coordinates of the second point 116 on the coupler 14 relative to the first point 114 on the hitch ball 34 along the ground surface 110 are equal to 2D coordinates of the second point 116 on the coupler 14 based on vehicle dynamics data, as described. Additionally, if the hitch assist system 10 inhibits a jump, the 2D coordinates for a center of a window 120 used to track the second point 116 are equal to the 2D coordinates of the second point 116 on the coupler 14 based on vehicle dynamics data. The window 120 may be used iteratively to search for the coupler 14. The hitch assist system 10 searches for the coupler 14 at 2D coordinates of the second point 116 based on vehicle dynamics data and within the window 120, which is a defined, bounded region around the 2D coordinates of the second point 116 based on the vehicle dynamics data.

Figure 8:
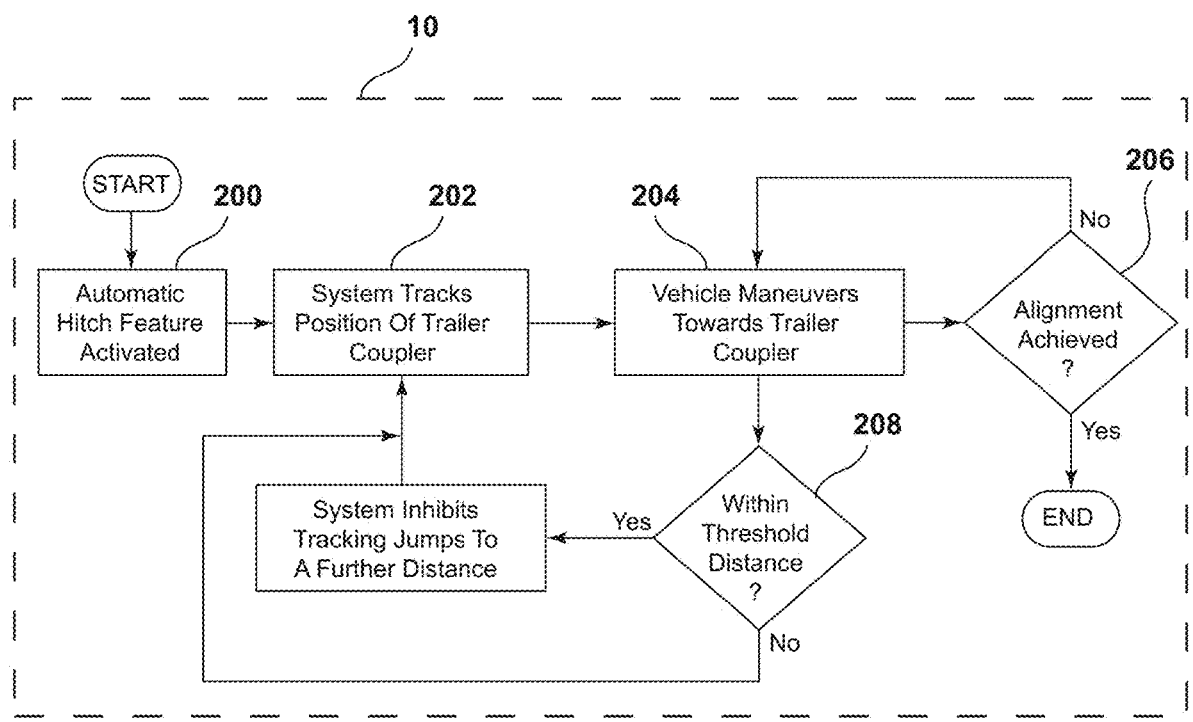
FIG. 8 is a control logic flow diagram depicting control logic to estimate the endpoint and inhibit tracking jumps.

FIG. 8 depicts control logic for the hitch assist system 10 to inhibit the controller 26 from tracking "skips" described previously. The hitch assist system 10 is activated, and performs any related steps during the early stages of the sequence as described at 200. At 202, the hitch assist system 10 tracks the coupler 14 using the imaging system 18. At 202, the hitch assist system 10 uses 2D coordinates along the ground surface 110 to track the coupler 14 as reported coordinates for the endpoint 35. The hitch assist system 10 automatically maneuvers the vehicle 12 towards the reported trailer coupler position at 204. As described, the maneuver continues until the hitch ball 34 is aligned with the coupler 14 at the endpoint 35 of the path 32 at 206. The vehicle 12 is stopped and secured at standstill at the endpoint 35 if the first point 114 on the hitch ball 34 is coaxial, or aligned with the second point 116 on the coupler 14 at 206. During the maneuver, however, the hitch assist system 10 monitors the distance 118 from the first point 114 on the hitch ball 34 to the second point 116 on the coupler 14. The distance 118 from the first point 114 and the second point 116 continually decreases as the vehicle 12 maneuvers along the path 32 in a direction of the trailer 16. If the distance 118 between the first point 114 on the hitch ball 34 and the second point 116 on the coupler 14 falls below a threshold value, for example 0.4 m, the hitch assist system 10 initiates a subroutine to prevent any tracking "skips" that would increase the distance 118 between the first point 114 on the hitch ball 34 and the second point 116 on the coupler 14 over a predetermined, maximum value, or second threshold at 208. The second threshold distance is a calibrated value, indicative of a distance at which the controller 26 skips as described. In an example, the second threshold distance is between 0.1 m and 0.8 m.

Once the vehicle 12 is within the first threshold distance from the trailer 16, the hitch assist system 10 inhibits "skips" above the second threshold when tracking the first and second points 114, 116 on the hitch ball 34 and coupler 14, respectively. If the controller 26 attempts to select a new point to track, and the new point increases the distance 118 between the first and second points 114, 116 greater than the second threshold, the hitch assist system 10 rejects the new point. Instead, a dead reckoned position from the dead reckoning device described above is reported as the coupler 14 to estimate the endpoint 35 of the path 32. The dead reckoned position is an interpolation of a position of the vehicle 12 based on vehicle dynamics data such as, but not limited to, vehicle speed, acceleration, pose, steering angle, and lateral acceleration. The controller 26 is notified that the new point was rejected, such that the controller 26 maintains the window 120 based on the dead reckoned position. Again, the second threshold for the "skip" is a calibrated value. The second threshold is set to allow minor tracking corrections to maintain high-precision within the hitch assist system 10 with a position of the coupler 14. The second threshold may also be set to prevent the controller 26 from skipping to the tongue 104, such as the jack assembly 112, for example. Again, in an example, the maximum value may be set between 0.1 m and 0.8 m.

Figure 9:
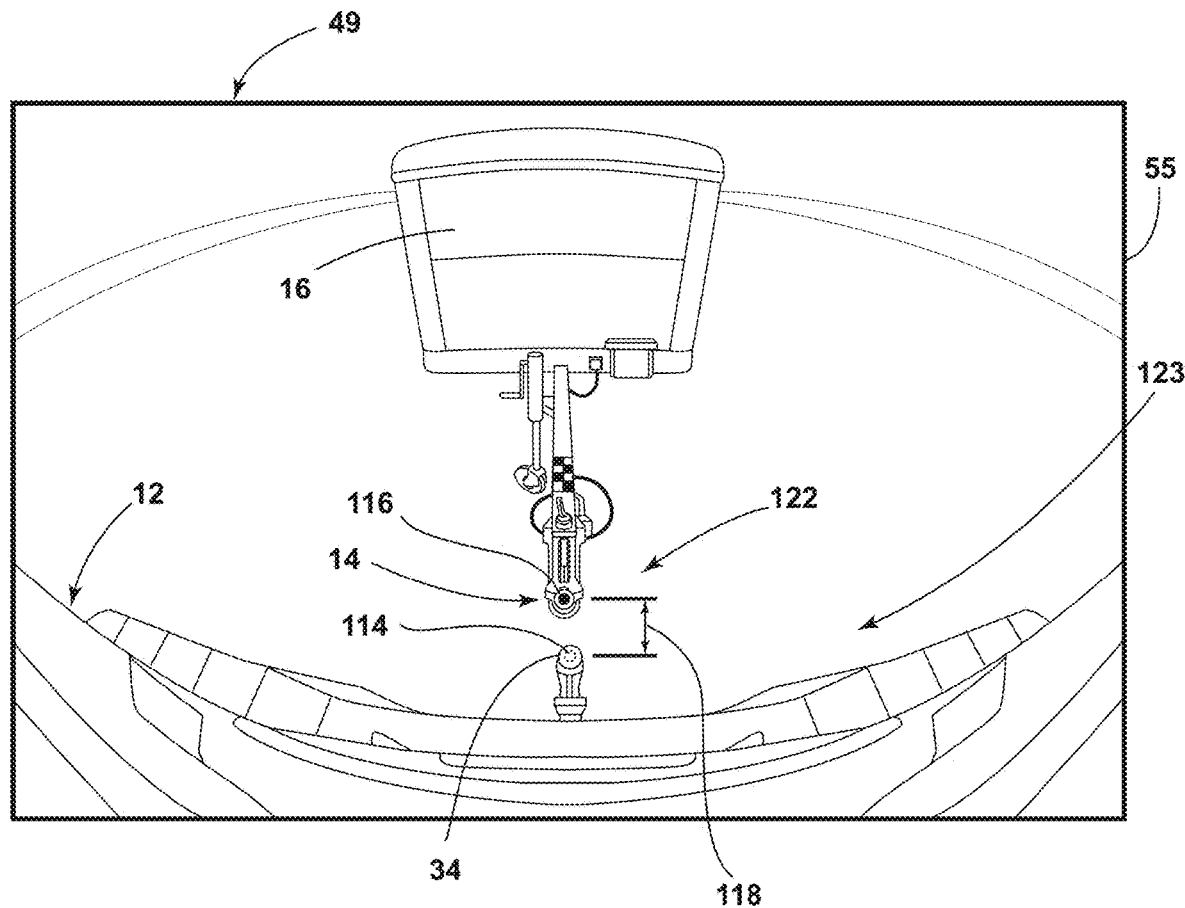
FIG. 9 is a rear, perspective view depicting a pixel-domain comparison between a hitch ball and a coupler to estimate a distance between the hitch ball and coupler.

FIG. 9 depicts a rear, perspective view depicting the hitch assist system 10 implementing a pixel-domain comparison 122 to estimate the distance 118 between the first point 114 on the hitch ball 34 and the second point 116 on the coupler 14. As described above, the hitch assist system 10 tracks the first point 114 on the hitch ball 34 and the second point 116 on the coupler 14. Here, the hitch assist system 10 uses a function designed to compare pixels to assess the overlap of the coupler 14 over-top the hitch ball 34, in order to track the distance 118 between first point 114 on the hitch ball 34 and the second point 116 on the coupler 14. While traditional distance estimation may be suitable for trailers 16 at distances above 0.5 m, pixel-domain comparison 122 may provide further accuracy and robustness near the end of the maneuver, for example, below the first threshold, by annulling errors in estimation of the endpoint 35.

Once the hitch assist system 10 detects that the coupler 14 is fully overlapping the hitch ball 34, from the field-of-view 49 of the rear camera 48, the braking system 70 is triggered to stop the vehicle 12. Alignment at the endpoint 35 depends an accurate measure of the first point 114 on the hitch ball 34, as well as the second point 116 on the coupler 14. Since the hitch assist system 10 is designed for an alignment accuracy of less than 0.1 m, the hitch assist system 10 can only tolerate extremely small errors. For example, if the first point 114 on the hitch ball 34 is offset by 0.1 m due to error, and the second point 116 on the coupler 14 is also offset by 0.1 m, the endpoint 35 may be off by 0.2 m, depending on error vector direction.

In the instance depicted in FIG. 9, the hitch assist system 10 uses standard distance estimation, described above, during the early maneuvering sequence, and initiates a pixel-domain comparison 122 when the distance 118 between the first point 114 on the hitch ball 34 and the second point 116 on the coupler 14 is below the first threshold. In the pixel-domain comparison, pixels indicative of the hitch ball 34 are compared relatively to pixels of the coupler 14. The pixel-domain comparison is measured in pixels, and linearly transformed to a relative position estimation in order to support the steering and braking systems 20, 70 while maneuvering the vehicle 12 on the path 32. For example, a pixel indicative of the first point 114 on the hitch ball 34 and a second pixel indicative of the second point 116 on the coupler 14 are linearly transformed to calculate the path 32 and endpoint 35. With pixel-domain comparison, estimation of the endpoint 35 becomes increasingly more accurate as the vehicle 12 maneuvers on the path 32, thus allowing for a high degree of accuracy in alignment between the hitch ball 34 and the coupler 14.

Figure 10:
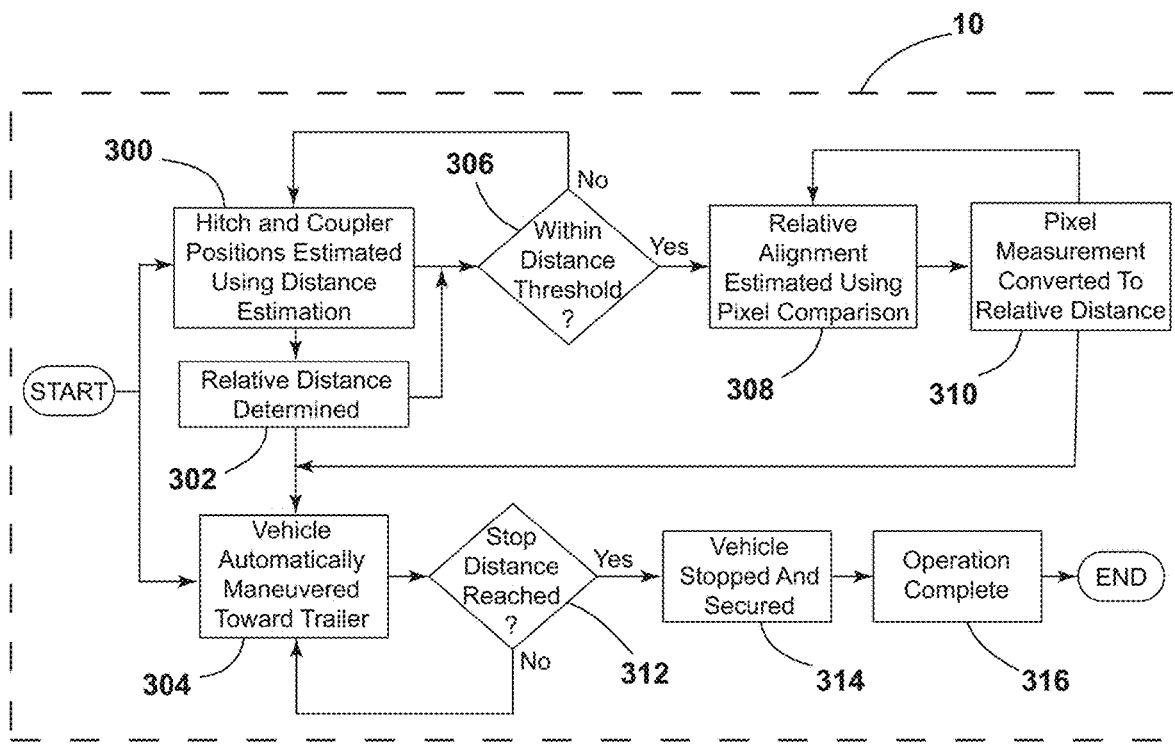
FIG. 10 is a control logic flow diagram depicting control logic to estimate the distance from the hitch ball to the coupler using the pixel-domain comparison.

FIG. 10 depicts control logic used by the hitch assist system 10 to compare pixels in the image data 55 to estimate the distance 118 between the first point 114 on the hitch ball 34 and the second point 116 on the coupler 14. As described above, the hitch assist system 10 uses the imaging system 18 to gather image data 55, and the controller 26 to estimate the distance 118, along the ground surface 110, between the first point 114 on the hitch ball 34, and the second point 116 on the coupler 14 at 300. The hitch assist system 10 determines a relative distance 118 between the first point 114 on the hitch ball 34 and the second point 116 on the coupler 14 at 302. The relative distance 118 provides a metric for a remaining distance until the vehicle 12 maneuvers along the path 32 to the endpoint 35. In another instance, the relative distance 118 is determined to be the remaining distance along the path 32 at 302. The steering and braking systems 20, 70 use distance data to maneuver the vehicle 12 along the path 32 toward the endpoint 35 at 304. The distance data may also be produced by the pixel-domain comparison, as described. Once the hitch assist system 10 reaches the first threshold (i.e., 0.8 m), at 306, the hitch assist system 10 estimates the relative distance 118 from the first point 114 on the hitch ball 34 to the second point 116 on the coupler 14, using pixel-domain comparison, at 308.

Again, traditional distance estimation is suitable when sufficient travel distance, for example, greater than the first threshold, to the trailer 16 remains, but within the first threshold, error becomes increasingly significant. The pixel-domain comparison provides a more accurate estimation when the vehicle 12 is within the first threshold distance to the trailer 16. Thus, use of both, traditional distance estimation and pixel-domain comparison, provides a complimentary strategy to accurately maneuver the vehicle 12 along the path 32. As the vehicle 12 maneuvers along the path 32 to be within the first threshold, the hitch assist system 10 changes to using the pixel-domain comparison to estimate the remaining distance at 308. The center of the hitch ball 34 is identified in pixel coordinates in the image data 55 as the first point 114, and a center of the coupler 14 is identified in pixel coordinates in the image data 55 as the second point 116. The pixel coordinates of the first and second points 114, 116 are assessed relative to each other, using a pixel count between the pixel coordinates at 308. The hitch assist system 10 uses the pixel count to convert the pixel coordinates to a distance 118 estimation between the first 114 and second 116 points at 310. To convert from pixels to meters, the hitch assist system 10 assumes a linear transformation from pixels to distance 118. In this way, error progressively diminishes as the hitch ball 34 approaches the coupler 14 due to a reduced distortion in the image data 55, as well as a reduction in viewing angle for the rear camera 48. The error is minimal by the time the vehicle 12 stops, thus providing a high accuracy of alignment.

The hitch assist system 10 converts pixel coordinates of the first and second points 114, 116 to an estimated distance using longitudinal and lateral distances between the pixel coordinates at 310. For example, the longitudinal distance is equal to a longitudinal pixel distance from the tongue 104 to the center 36 of the hitch ball 34 being multiplied by a first constant, which is then added to a second constant value. Likewise, the lateral distance is equal to a lateral pixel distance from the tongue 104 to the center 36 of the hitch ball 34 being multiplied by a third constant, which is then added to a fourth constant. The longitudinal and lateral pixel distances provide the hitch assist system 10 a conversion at 310 to estimate the relative distance 118 between the first and second points 114, 116. Using this distance data, the vehicle 12 continues maneuvering at 304 until the second threshold triggers the vehicle 12 to a stop (i.e., 1.1 cm) at 312. Again, this maximum value is calibrated based on vehicle dynamics data, to achieve the best possible alignment. The vehicle dynamic data includes a vehicle speed, braking distance, algorithm processing time, network delays, and any other factor that influences vehicle travel to the endpoint 35. The vehicle dynamics data is averaged into a nominal distance, being the maximum value indicative of the second threshold, at which the vehicle 12 stops using the braking system 70. The vehicle 12 is braked to a stop, and secured at a standstill, as described. Once the vehicle is at a standstill at 314, the hitch assist system 10 completes the maneuver at 316, and the hitch ball 34 is aligned directly underneath the coupler 14.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A system for assisting in aligning a vehicle for hitching with a trailer comprising:
   a steering system that adjusts a steering angle of the vehicle;
   a braking system that adjusts a speed of the vehicle;
   an imaging system that receives image data of a hitch ball and trailer coupler depicted within a field of view; and
   a controller:
      that estimates a distance between a first point on the hitch ball and a second point on the trailer coupler, wherein the points are parallel to a plane defined by a surface beneath the hitch ball and trailer coupler,
      that updates and tracks the estimated distance between pixels associated with the first point and the second point in response to the distance being less than a first threshold,
      that rejects the estimate of the distance from being greater than a second threshold within the field of view responsive to the distance being less than the first threshold and continues to update the estimate of the distance to values less than the second threshold,
      that maneuvers, via the steering and braking systems, the vehicle along a path, and
      that identifies an alignment of an overlap between the pixels of the first point with the second point on the plane.

2. The system for assisting in aligning a vehicle for hitching with a trailer of claim 1, wherein the controller:
   notifies the imaging system of the estimate of the distance being greater than the second threshold.

3. The system for assisting in aligning a vehicle for hitching with a trailer of claim 1, wherein the controller:
   maneuvers, via the steering and braking systems, the vehicle along the path responsive to the distance being greater than the first threshold.

4. The system for assisting in aligning a vehicle for hitching with a trailer of claim 1, wherein the first point on the hitch ball is indicative of a center point of the hitch ball, and the second point on the trailer coupler is indicative of a center point of the trailer coupler.

5. The system for assisting in aligning a vehicle for hitching with a trailer of claim 1, wherein a pixel-domain comparison is linearly transformed to track the distance.

6. The system for assisting in aligning a vehicle for hitching with a trailer of claim 1, wherein the controller:
   activates the braking system to stop the vehicle on the path responsive to the distance being less than a third threshold, wherein the third threshold is defined by a plurality of factors.

7. A hitch assist system for a vehicle comprising:
   an imaging system that receives image data of a hitch ball and a trailer coupler in a field of view; and a controller:
  that estimates a distance from the hitch ball to the trailer coupler;
  that updates the estimate of the distance in response to a change in a position of the hitch ball within the field of view as the vehicle approaches the trailer coupler;
  that tracks the distance to trailer coupler and detects the distance being less than a first threshold,
  that continues to update the estimate of the distance after the distance from the hitch ball to the trailer is within the first threshold,
  that in response to the updated estimate of the distance exceeding a second threshold within the first threshold, rejects the updated estimate in excess of the second threshold and continues to update the estimate of the distance to values less than the second threshold, and
  that maneuvers, via steering and braking systems, the vehicle along a path such that the distance is indicative of the points being coaxial.

8. The hitch assist system of claim 7, wherein the controller:
  notifies the imaging system of the estimate of the distance being greater than the second threshold.

9. The hitch assist system of claim 7, wherein the controller:
  maneuvers, via the steering and braking systems, the vehicle along the path responsive to the distance being greater than the first threshold.

10. The hitch assist system of claim 7, wherein the controller:
  activates the braking system to stop the vehicle on the path responsive to the distance being less than a third threshold, wherein the third threshold is defined by a plurality of factors.

11. A method for assisting in aligning a vehicle for hitching with a trailer, comprising:
  receiving image data of a hitch ball and trailer coupler in a field of view from a vehicle imaging system;
  estimating a distance from the hitch ball to the trailer coupler with a controller;
  updating the estimate of the distance in response to a change in a position of the hitch ball within the field of view;
  tracking the distance to the trailer coupler and detecting the distance being less than a first threshold with the controller;
  in response to the distance less than the first threshold, rejecting a change in the estimate of the distance exceeding a second threshold, wherein the rejection of the estimate prevents the controller from changing the estimate of the distance to a point further than the second threshold, thereby preventing the estimate of the distance from jumping to objects or points near the trailer coupler that are beyond the second threshold and within the field of view; and
  controlling, via steering and braking systems, the vehicle along a path such that the distance is indicative of an alignment of the hitch ball and the trailer coupler.

12. The method for assisting in aligning a vehicle for hitching with a trailer of claim 11 further comprising:
  notifying, via the controller, the imaging system of the estimate of the distance being greater than the second threshold.

13. The method for assisting in aligning a vehicle for hitching with a trailer of claim 11 further comprising:
  controlling, via the steering and braking systems, the vehicle along the path responsive to the distance being greater than the first threshold.

14. The method for assisting in aligning a vehicle for hitching with a trailer of claim 11 further comprising:
  activating the braking system to stop the vehicle on the path responsive to the distance being less than a third threshold, wherein the third threshold is defined by a plurality of factors.

15. The system for assisting in aligning a vehicle for hitching with a trailer of claim 1, wherein the second threshold is limited within the field of view, thereby preventing the estimate of the distance from jumping to objects or points near the trailer coupler and within the field of view.

16. The hitch system of claim 7, wherein the rejection of the updated estimate of the distance exceeding the second threshold inhibits the updated estimate of the distance from skipping from the trailer coupler to nearby objects or points beyond the second threshold within the field of view.

\* \* \* \* \*

UNITED STATES PATENT AND TRADEMARK OFFICE
CERTIFICATE OF CORRECTION

PATENT NO. : 11,851,061 B2
APPLICATION NO. : 16/550669
DATED : December 26, 2023
INVENTOR(S) : Niewiadomski et al.

Page 1 of 1

It is certified that error appears in the above-identified patent and that said Letters Patent is hereby corrected as shown below:

In the Claims

Column 18:
Claim 1, Line 32;
After "distance" delete "from".

Signed and Sealed this
Sixth Day of February, 2024

Katherine Kelly Vidal
*Director of the United States Patent and Trademark Office*